No. 630,471. Patented Aug. 8, 1899.
F. STUTZMAN.
REVERSING GEAR FOR MOTOR VEHICLES.
(Application filed Mar. 1, 1899.)
(No Model.) 2 Sheets—Sheet 1.
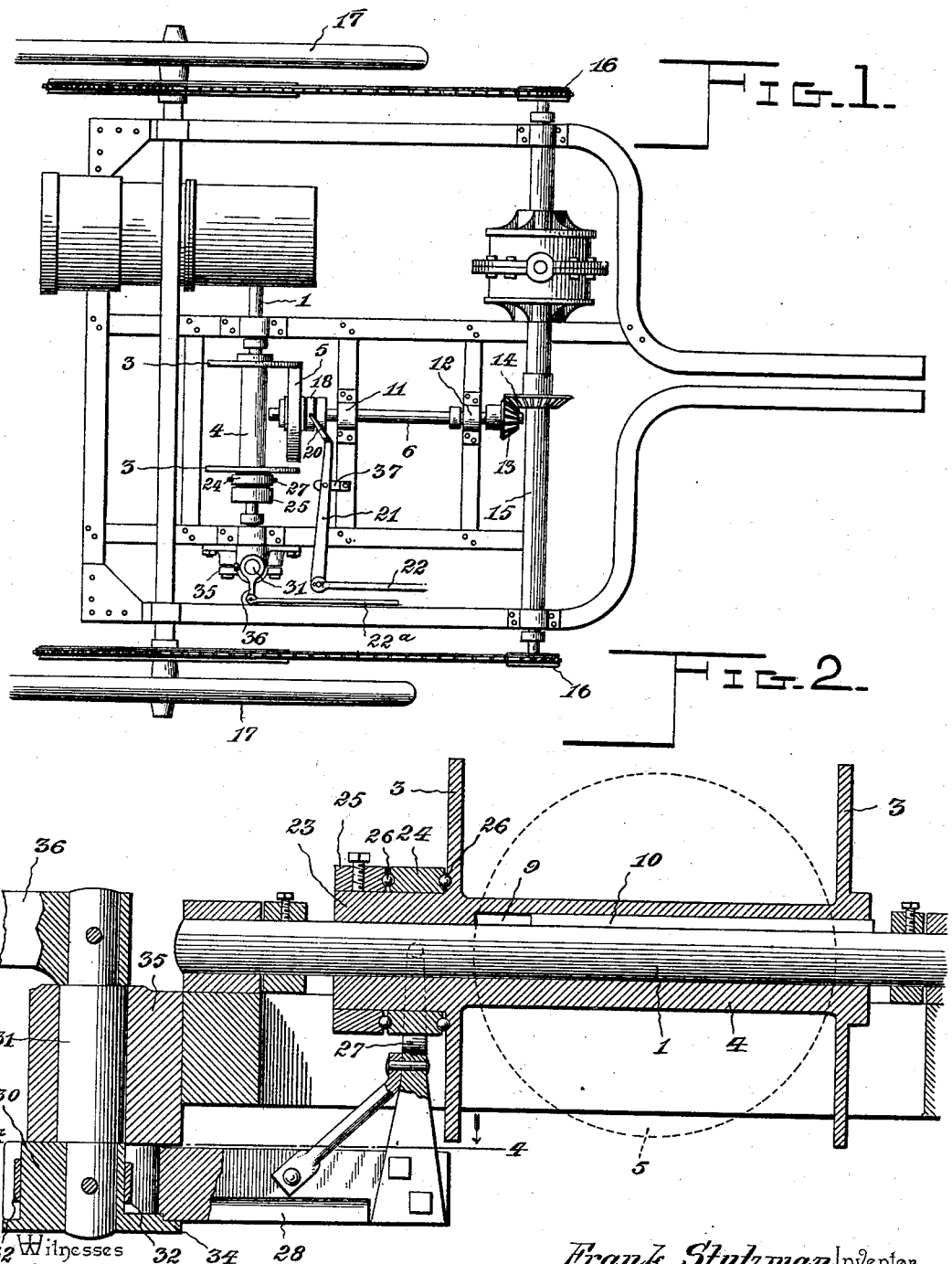
Frank Stutzman, Inventor No. 630,471. Patented Aug. 8, 1899.
F. STUTZMAN.
REVERSING GEAR FOR MOTOR VEHICLES.
(Application filed Mar. 1, 1899.)
(No Model.) 2 Sheets—Sheet 2.
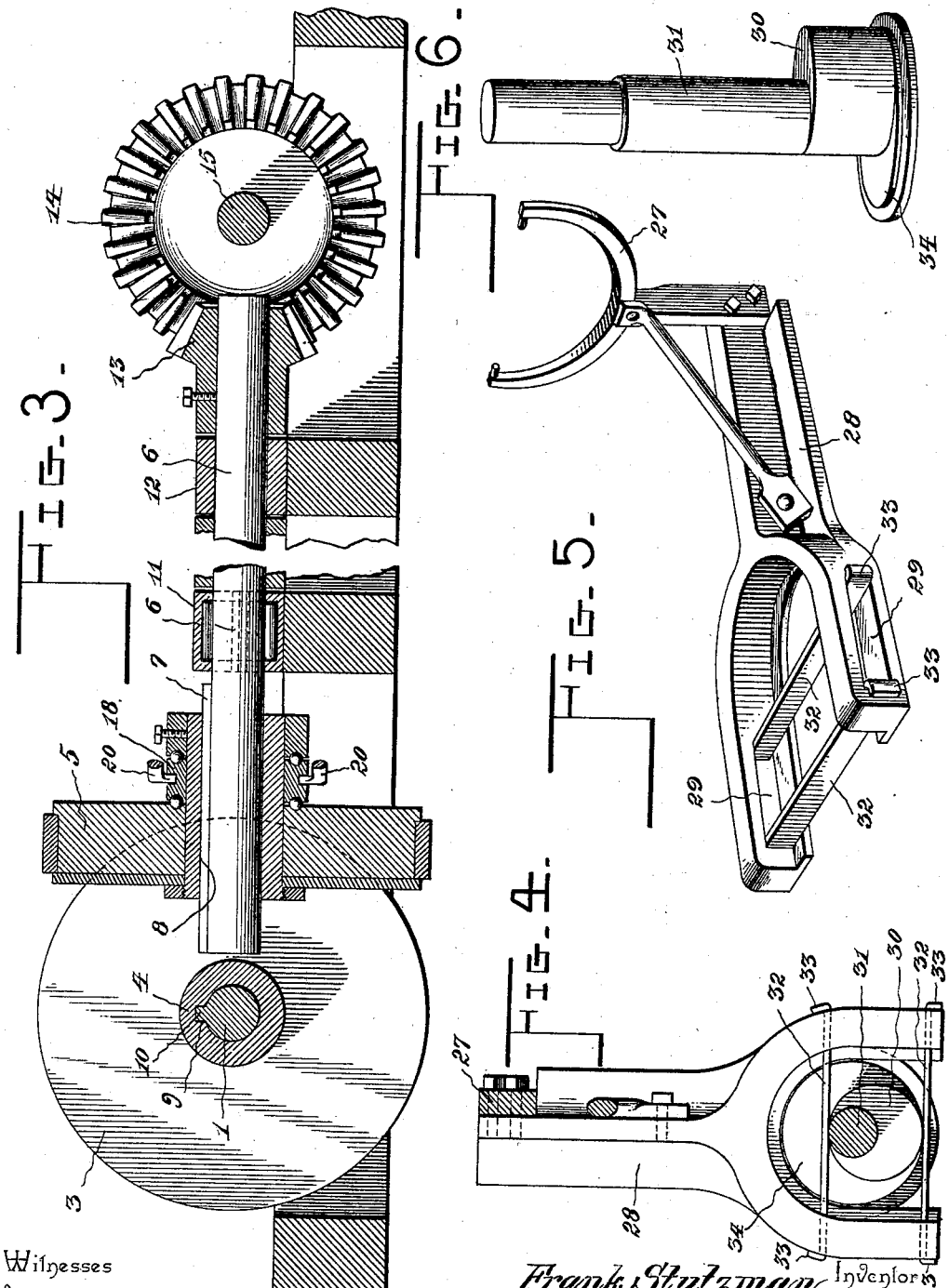
Witnesses
John F. Deukerwid
J. J. Riley
Frank Stutzman, Inventor
By his Attorneys,
C. A. Snow & Co.

UNITED STATES PATENT OFFICE.

FRANK STUTZMAN, OF WILLIAMSPORT, PENNSYLVANIA.

REVERSING-GEAR FOR MOTOR-VEHICLES.

SPECIFICATION forming part of Letters Patent No. 630,471, dated August 8, 1899.

Application filed March 1, 1899. Serial No. 707,294. (No model.)

*To all whom it may concern:*

Be it known that I, FRANK STUTZMAN, a citizen of the United States, residing at Williamsport, in the county of Lycoming and State of Pennsylvania, have invented a new and useful Reversing-Gear for Motor-Vehicles, &c., of which the following is a specification.

The invention relates to improvements in reversing-gear for motor-vehicles and the like.
The object of the present invention is to improve the construction of reversing-gear for motor-vehicles and to provide a simple and comparatively inexpensive device capable of being readily adjusted to reverse a motor-vehicle or other machine and adapted to enable the speed to be readily controlled, so that a vehicle may be made to run either fast or slow without varying the speed of the drive or motor shaft.
A further object of the invention is to provide a simple and efficient device adapted to hold the parts at the proper adjustment and designed to dispense with pawl-and-ratchet and similar devices which have to be thrown into and out of their locking position by hand, so that it will be only necessary for the operator to move the reversing-lever without manipulating the locking device.

The invention consists in the construction and novel combination and arrangement of parts hereinafter fully described, illustrated in the accompanying drawings, and pointed out in the claims hereto appended.

In the drawings, Figure 1 is a reverse plan view of a motor-vehicle provided with a reversing-gear constructed in accordance with this invention. Fig. 2 is a transverse sectional view. Fig. 3 is a longitudinal sectional view. Fig. 4 is a horizontal sectional view on line 4 4 of Fig. 2. Fig. 5 is a detail perspective view of the transverse connecting-bar. Fig. 6 is a detail perspective view of the lower end of the reversing-shaft, illustrating the construction of the cam.
Like numerals of reference designate corresponding parts in all the figures of the drawings.

1 designates a transverse drive or motor shaft designed to be connected with the motor of a vehicle; but the reversing-gear may be employed on any other machine, and the said drive or motor shaft has a pair of friction-wheels 3 splined on it and connected by a hub or sleeve 4 and adapted to engage alternately with an adjustable friction gear or pinion 5, whereby a longitudinal shaft 6, upon which the friction gear or pinion is mounted, may be driven in either direction. The friction gear or pinion 5 is provided on the interior of its hub with a groove 8, which receives a feather or spline 7, extending longitudinally of the shaft 6, and the said gear or pinion 5 is capable of movement longitudinally of the said shaft to arrange it at different distances from the center of the friction-wheels, whereby the speed of the longitudinal shaft may be varied without changing that of the drive or motor shaft. The friction gear or pinion 5 is caused to mesh or engage either of the friction-wheels 3 by shifting the latter transversely of the vehicle, and the friction-wheel is provided with a groove 9 to receive the feather or spline 10 of the motor-shaft.

The longitudinal shaft 6 is journaled in suitable bearings 11 and 12, the bearing 11 being preferably provided with antifriction-rolls to relieve the parts of friction resulting from the lateral thrust incident to the frictional engagement of the wheels 3 and the gear or pinion 5. The front end of the longitudinal shaft is connected by bevel-gears 13 and 14 with a transverse shaft 15, journaled in suitable bearings and connected by sprocket-gearing 16 with the hind wheels 17 of the vehicle.

The adjustable friction gear or pinion 5 is provided with a ball-bearing collar 18, having annular series of antifriction-balls arranged at its edges, and it is connected with a yoke 20 of a lever 21, fulcrumed between its ends and extending outward from the longitudinal shaft to one side of the vehicle and connected at its outer end by a rod 22 with a suitable operating-lever, by means of which the friction gear or pinion 5 is adjusted.

One of the friction-wheels 3 has a hub extension 23, on which is mounted a ball-bearing collar 24, similar to that before described, and having annular series of antifriction-balls interposed between its edges and the adjacent friction-wheel 3, and a fixed collar 25, arranged on the outer end of the hub extension, and the balls 26 enable the friction-wheels to be shifted frictionlessly. The ball-bearing collar 24 is connected with a yoke 27 of a connecting-bar 28, disposed transversely of the vehicle and having its outer end bifurcated or forked and provided at the sides of the fork or bifurcation with similar loops formed by openings 29. Within the fork or bifurcation of the transverse connecting-bar is arranged a cam 30, mounted on a reversing-shaft 31 and interposed between a pair of springs 32, extending across the fork or bifurcation and supported by the openings of the sides thereof. The terminals of the springs are bent at right angles to form portions 33 for engaging the outer faces of the sides of the connecting-bar, and these springs engage the cam with sufficient force to lock the reversing-gear in either position, thereby obviating the necessity of employing ratchet mechanism or analogous devices which have to be manipulated by hand independently of the reversing-shaft. The cam is provided at its lower end or face with an annular flange 34, forming a disk to engage the lower face of the forked portion of the connecting-bar, and the adjacent faces of the connecting-bar and the disk or flange are recessed or rabbeted to provide an interlocking connection for preventing the parts from sliding on each other laterally of the connecting-bar and to form a guide for the latter in its longitudinal shifting movement.

The reversing-shaft is journaled in a sectional bearing 35, and it is provided at its upper end with a crank or lever 36, which is connected by a rod 22ª with suitable operating mechanism. In operating the reversing-shaft it is only necessary to shift the crank or lever, and the locking device will automatically engage the cam and retain the friction gear or pinion in engagement with either of the friction-wheels.

The lever 21, which has the yoke 20 at its inner end, is fulcrumed on a short oscillating link 37, which permits the lever to move inward and outward to adjust itself to the position of the friction gear or pinion.

The invention has the following advantages: The reversing-gear, which is simple and comparatively inexpensive in construction, is applicable to motor-vehicles and various other machines. It is adapted to enable the same to be quickly reversed, and it is also capable of controlling the speed of a vehicle or machine without varying that of the motor or drive-shaft. The locking device for holding the reversing-gear in the desired position is automatic in its operation and positive and reliable, and it is controlled by simply shifting the crank or lever of the reversing-shaft.

Changes in the form, proportion, size, and the minor details of construction within the scope of the appended claims may be resorted to without departing from the spirit or sacrificing any of the advantages of this invention.

What is claimed is—

1. In a device of the class described, the combination with a pair of friction-wheels adapted to be shifted to bring either of them in engagement with a friction gear or pinion, of a connecting-bar extending from the friction-wheels, a pair of springs mounted on the connecting-bar, and a cam interposed between the springs and adapted to shift the connecting-bar, said springs being capable of locking the cam at any desired adjustment, substantially as described.

2. In a device of the class described, the combination of a connecting-bar provided with a pair of springs, and a cam operating between the springs, arranged to be locked by the same and capable of shifting the connecting-bars, substantially as described.

3. A device of the class described comprising a connecting-bar having a fork or bifurcation, a pair of springs extending across the same and spaced apart, and a shaft operating between the springs, and adapted to shift the connecting-bar, said springs being adapted to lock the cam at any adjustment, substantially as described.

4. A device of the class described comprising a connecting-bar having a fork or bifurcation and provided at opposite sides thereof with openings, a pair of springs extending across the fork or bifurcation, supported in said openings and interlocked with the connecting-bar, and a cam operating between the springs, adapted to shift the connecting-bar and arranged to be locked by the said springs, substantially as described.

5. A device of the class described comprising a connecting-bar having a fork or bifurcation and recessed at one of its faces, a pair of springs extending across the fork or bifurcation, and a cam operating between the springs and provided with a flange having a recess corresponding with that of the connecting-bar, substantially as described.

6. In a device of the class described, the combination with a friction gear or pinion, of a pair of friction-wheels, a connecting-bar extending from the pair of friction-wheels, a cam arranged at the outer end of the connecting-bar and adapted to shift the same, and a spring mounted on the connecting-bar, engaged by the cam and adapted to lock the same at any adjustment, substantially as described.

7. In a device of the class described, the combination of a friction gear or pinion having a collar, a lever provided with a yoke connected with the collar, a pair of friction-wheels located at opposite sides of the friction gear or pinion, and having a collar, a connecting-bar provided with a yoke receiving the collar of the friction-wheels, a reversing-shaft having a cam arranged at the outer end of the connecting-bar, and a pair of springs mounted on the connecting-bar and engaging the cam, substantially as and for the purpose described.

In testimony that I claim the foregoing as my own I have hereto affixed my signature in the presence of two witnesses.

FRANK STUTZMAN.

Witnesses:
JOHN H. SIGGERS,
ROBT. E. CRUMP.